L. P. DICKEY.
HOLLOW CHAIN CHANDELIER SUPPORT.
APPLICATION FILED JULY 9, 1908.

925,309.

Patented June 15, 1909.

Witnesses:

Inventor:
Lawrence P. Dickey
By his Attorney
F. DeWitt Goodwin

UNITED STATES PATENT OFFICE.

LAURENCE P. DICKEY, OF PHILADELPHIA, PENNSYLVANIA.

HOLLOW-CHAIN CHANDELIER-SUPPORT.

No. 925,309.  Specification of Letters Patent.  Patented June 15, 1909.

Application filed July 9, 1908. Serial No. 442,652.

To all whom it may concern:

Be it known that I, LAURENCE P. DICKEY, a citizen of the United States, residing at Philadelphia, in the county of Philadelphia and State of Pennsylvania, have invented certain new and useful Improvements in Hollow-Chain Chandelier-Supports, of which the following is a specification.

My invention relates to a hollow chain chandelier support, and the object of my invention is to provide a support for chandeliers which will have the appearance of a chain.

A further object of my invention is to construct said support of hollow pipe to form a continuous passageway for gas, oil or electric conductors; and a still further object of my invention is to provide means for readily assembling the parts of the support and for securing the said parts together.

Figure 1:
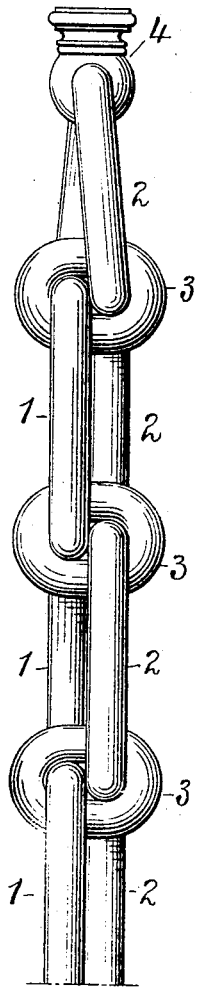
Figure 2:
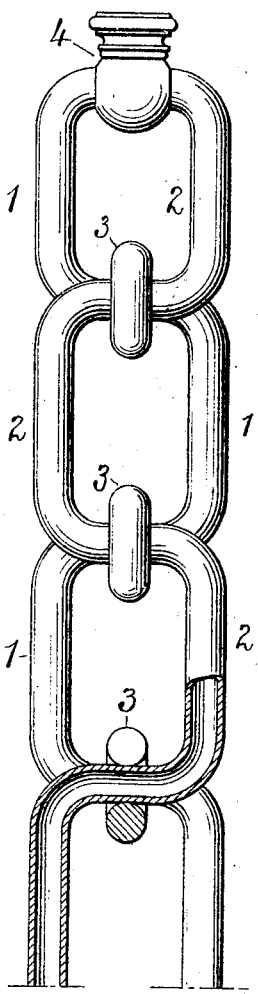

Referring to the drawings: Figure 1 is a side elevation of my hollow chain chandelier support; Fig. 2. is a front elevation of the same, partly in section; Figs. 3, 4, 5 and 6 are detached views of the parts shown in Figs. 1 and 2.

Figures 3, 4, 5:
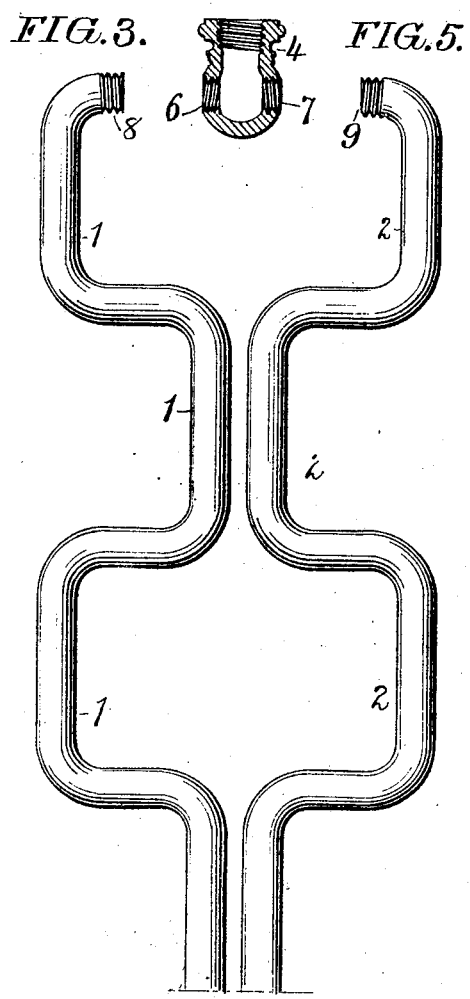
Figure 6:
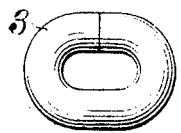

In the drawing 1 and 2 represent hollow tubes which are curved as shown in Figs. 3 and 5. The tube 2 is curved correspondingly to the tube 1 so that when the tubes are placed together with the curved portions reversed to each other they will have the appearance of a chain as shown in Fig. 2. The two tubes are secured together by rings 3, which embrace the tubes at the points where they contact with each other. The rings 3 are split, as shown in Fig. 6, so that they may be readily bent around the tubes as shown in Fig. 1.

Any suitable form of fitting may be used at the ends of the tubes. In the drawing the tubes are joined at their ends by the T-joint 4, which is particularly adapted for use when the tubes are both used to convey gas. The T-joint is provided with apertures 6 and 7 having right and left hand threads to receive the ends 8 and 9 of the tubes 1 and 2, which also have right and left hand threads, so that the tubes 1 and 2 may be joined together by turning the T-joint 4 without turning the tube.

When my improved chandelier support is used as for conveying both gas and electrical conductors, each tube may be provided with a separate fitting at the ends of the same. When gas alone is used and only one tube is needed to convey the same the opposite member from the gas tube may be made solid without departing from my invention.

The tubes are made of material having sufficient strength to carry the weight of the chandelier. The tubes are also strengthened by the rings 3 which secure the tubes together and prevent the curves in said tubes becoming distorted when the support is subjected to an unusual strain.

Having thus described my invention I claim and desire to secure by Letters Patent.

1. In an article of the character described, the combination of two correspondingly curved members, said curved members placed together in parallel planes with the curved portions thereof reversed to each other, rings placed at right angles to the planes of said curved members and said rings encircling said curved members at the points of intersection of said curved members to secure the latter together.

2. In an article of the character described, the combination of two correspondingly curved members, said curved members placed together in parallel planes with the curved portions thereof reversed to each other, rings placed at right angles to the planes of said curved members, and said rings split and placed around said curved members at the points of intersection of said curved members to secure the latter together.

In testimony whereof I affix my signature in presence of two witnesses.

LAURENCE P. DICKEY.

Witnesses:
 JOHN F. ATKIN,
 JOSEPH B. LANNING.